US012693450B2

(12) United States Patent　　　(10) Patent No.: US 12,693,450 B2
Boyd et al.　　　　　　　　　　　　(45) Date of Patent: Jul. 28, 2026

(54) PROCESSING OF SUPERHYDROPHILIC, INFRARED TRANSMISSIVE, ANTI-REFLECTIVE NANOSTRUCTURED SURFACES

(71) Applicant: The Government of the United States of America, as represented by the Secretary of the Navy, Arlington, VA (US)

(72) Inventors: Darryl A. Boyd, Alexandria, VA (US); Jesse A. Frantz, Landover, MD (US); Shyam S. Bayya, Ashburn, VA (US); Lynda E. Busse, Alexandria, VA (US); Jasbinder S. Sanghera, Ashburn, VA (US); Woohong Kim, Lorton, VA (US); Ishwar D. Aggarwal, Waxhaw, NC (US)

(73) Assignee: The Government of the United States of America, as represented by the Secretary of the Navy, Arlington, VA (US)

( * ) Notice: Subject to any disclaimer, the term of this patent is extended or adjusted under 35 U.S.C. 154(b) by 745 days.

(21) Appl. No.: 17/131,367

(22) Filed: Dec. 22, 2020

(65) Prior Publication Data

US 2021/0109256 A1　　Apr. 15, 2021

Related U.S. Application Data

(62) Division of application No. 15/193,210, filed on Jun. 27, 2016, now abandoned.

(Continued)

(51) Int. Cl.
*G02B 1/18*　　　(2015.01)
*B05D 1/18*　　　(2006.01)
(Continued)

(52) U.S. Cl.
CPC ................. *G02B 1/18* (2015.01); *B05D 1/18* (2013.01); *B05D 1/185* (2013.01); *B05D 5/02* (2013.01);
(Continued)

(58) Field of Classification Search
CPC .... C03C 2217/76; C03C 2217/75; B05D 5/04
See application file for complete search history.

(56) References Cited

U.S. PATENT DOCUMENTS

2001/0024684 A1 * 9/2001 Steiner ................... G02B 1/111
　　　　　　　　　　　　　　　　　　　427/407.1
2008/0199657 A1 * 8/2008 Capron ................... B05D 1/62
　　　　　　　　　　　　　　　　　　　427/535

(Continued)

FOREIGN PATENT DOCUMENTS

WO　　WO-2015177229 A2 * 11/2015　............. B05D 1/005

OTHER PUBLICATIONS

J.H. Wang, Coatings for Biomedical Applications, Chapter 5, Woodhead Publishing Series in Biomaterial, 2012, pp. 143-175 (Year: 2012).*

(Continued)

*Primary Examiner* — James M Mellott
(74) *Attorney, Agent, or Firm* — US Naval Research Laboratory; Jorie L. Stroup

(57) ABSTRACT

A method for producing nanostructured, hydrophilic, transmissive, anti-reflective surfaces is described. The method for providing a hydrophilic surface includes steps of providing a substrate that is transmissive in at least one wavelength in the infrared to ultraviolet range of the electromagnetic spectrum and comprises at least one surface including nanostructures of a size smaller than the at least one wavelength; and functionalizing the at least one surface with hydroxyl groups thereon. This method provides devices (Continued)

having excellent transmittance and anti-reflectance properties and which are resistant to seawater.

5 Claims, 10 Drawing Sheets

Related U.S. Application Data

(60) Provisional application No. 62/184,269, filed on Jun. 25, 2015.

(51) Int. Cl.
| | |
|---|---|
| *B05D 3/14* | (2006.01) |
| *B05D 5/02* | (2006.01) |
| *B05D 5/08* | (2006.01) |
| *C03C 17/30* | (2006.01) |
| *C03C 17/32* | (2006.01) |
| *G02B 1/118* | (2015.01) |

(52) U.S. Cl.
CPC .............. *B05D 5/083* (2013.01); *C03C 17/30* (2013.01); *C03C 17/32* (2013.01); *G02B 1/118* (2013.01); *B05D 3/142* (2013.01); *B05D*
2203/35 (2013.01); *C03C 2217/732* (2013.01); *C03C 2217/76* (2013.01)

(56) References Cited

U.S. PATENT DOCUMENTS

| | | | | |
|---|---|---|---|---|
| 2009/0078303 A1* | 3/2009 | Brezoczky | .............. | F24S 23/80 |
| | | | | 136/246 |
| 2012/0058355 A1* | 3/2012 | Lee | .................... | C09D 101/286 |
| | | | | 427/407.1 |
| 2017/0120294 A1* | 5/2017 | Portet | .................. | B05D 3/0446 |
| 2019/0093150 A1* | 3/2019 | Laible | .................... | A01N 59/00 |

OTHER PUBLICATIONS

Son et al., A practical superhydrophilic self cleaning and antireflective surface for outdoor photovoltaic applications, Solar Energy Materials & Solar Cells, 98, 2012, pp. 46-51 (Year: 2012).*
J. Son et al. / Solar Energy Materials & Solar Cells 98 (2012) 46-51.*
D. A. Zeze et al., J. Appl. Phys., vol. 92, No. 7, Oct. 1, 2002.*
R.L. DeRosa et al. / Journal of Non-Crystalline Solids 331 (2003) 32-40.*

\* cited by examiner

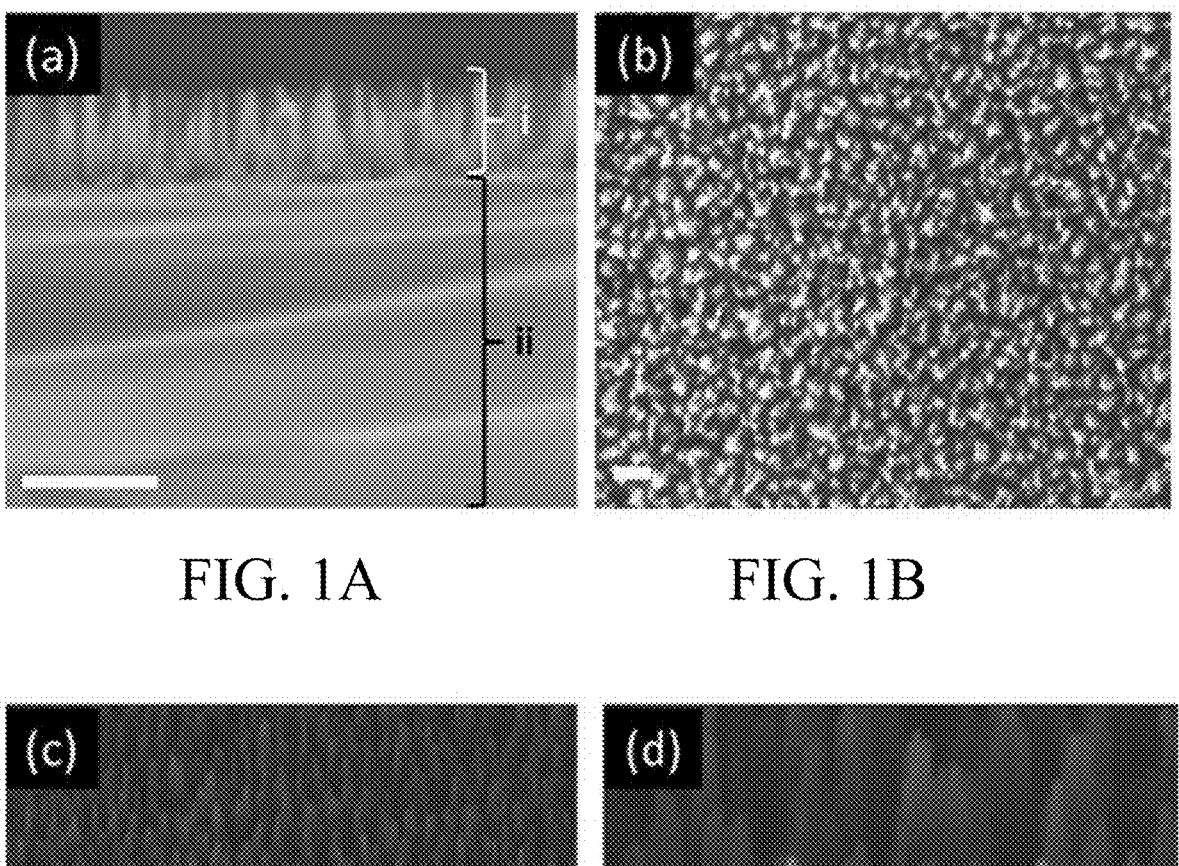
FIG. 1A                    FIG. 1B
FIG. 1C                    FIG. 1D

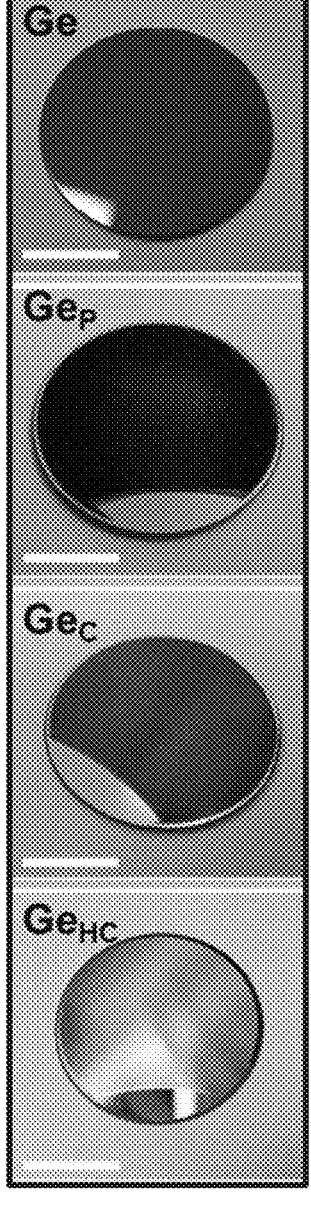
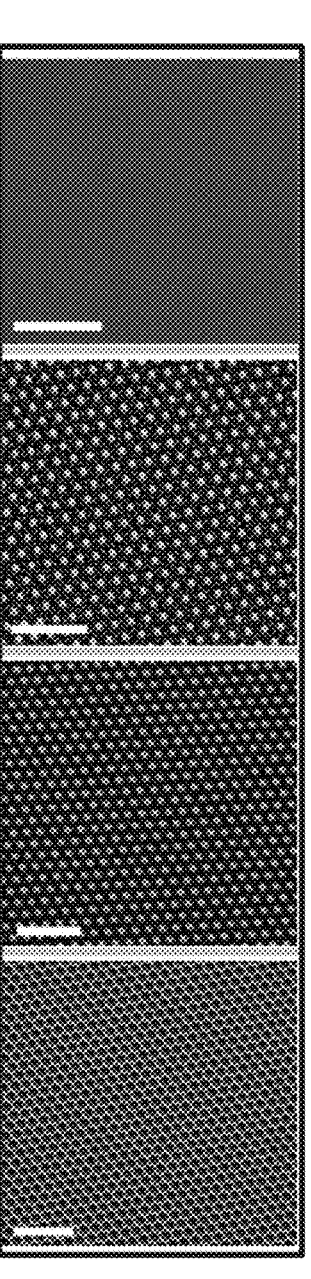
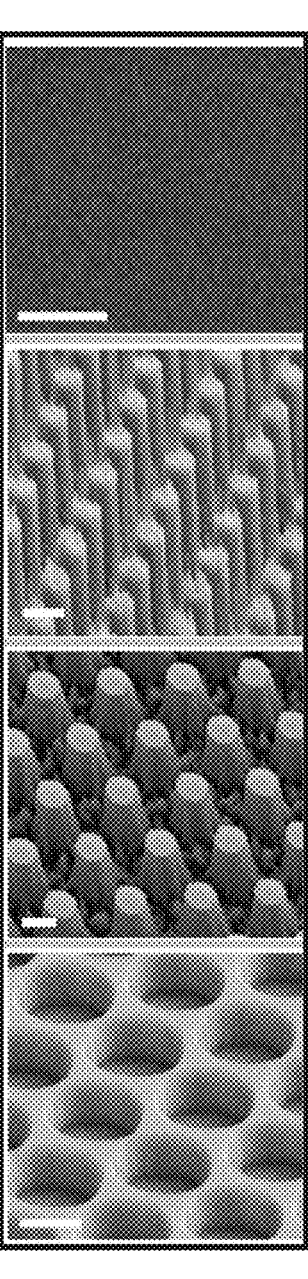
FIG. 2A                FIG. 2B                FIG. 2C

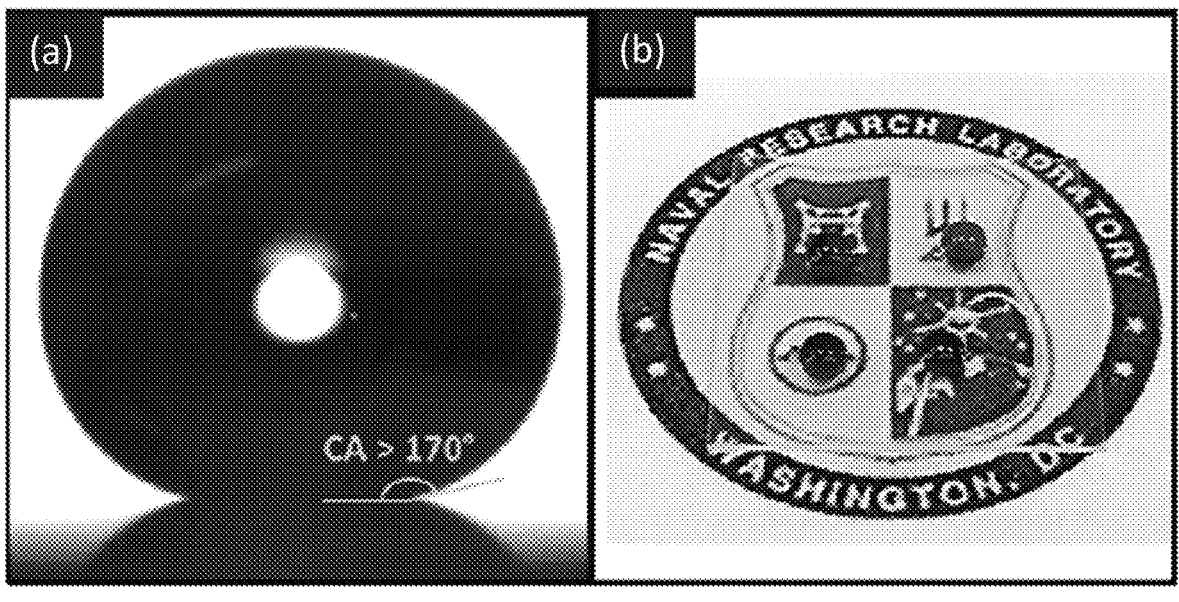
FIG. 5A                    FIG. 5B
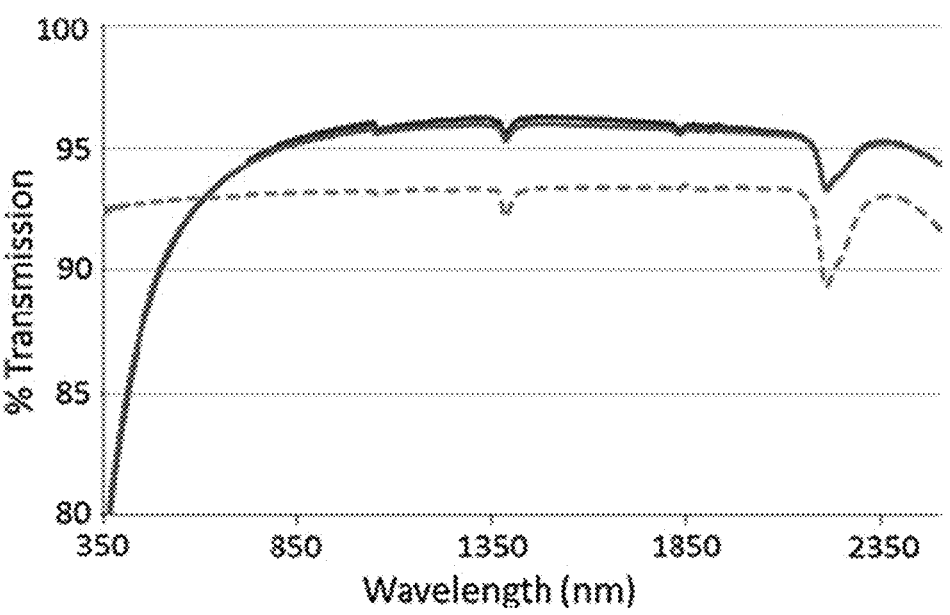
FIG. 6

PROCESSING OF SUPERHYDROPHILIC, INFRARED TRANSMISSIVE, ANTI-REFLECTIVE NANOSTRUCTURED SURFACES

RELATED APPLICATIONS

This application is a divisional application of U.S. application Ser. No. 15/193,210, filed Jun. 27, 2016, which claimed the benefit of U.S. provisional application No. 62/184,269, filed Jun. 25, 2015.

TECHNICAL FIELD

This disclosure pertains to a method of making superhydrophobic, or superhydrophilic materials having nanoscale features that impart anti-glare properties and enhanced transmittance in the ultraviolet (UV), visible and infrared (IR) region of the light spectrum. Such materials may also maintain their wettability characteristics in seawater.

BACKGROUND

Nature has provided numerous examples of materials with surfaces having nanoscale features that serve a practical survival purpose for living species. The material that comprises a moth's eye is one such surface. The surface of moth eye provides advantageous transmission and anti-reflection ("AR") properties that allow a moth to see in dim light and prevents reflection of light off of the moth eye in order to help evade potential predators.

Upon examination, the structure of the moth's eye has been determined to contain an array of nanoscopic features that are responsible for its AR character. These features allow the surface to transmit a large fraction of incident light, allowing the moth to see in dimly lit areas while at the same time limiting reflection so that the moth's eye can go visually undetected by predators.

There are many well-known moth eye mimic technologies that work well for AR for wavelengths from the visible into the mid-IR. An array of different materials have been modified to contain periodic and randomly nanopatterned surfaces. The application of the nanopattern onto a surface has often been accomplished by coating a surface with a material to impart the AR properties.

When nanoscale features are patterned into the surface of a transparent substrate, the shape and dimensions of those features determine the light transmission as a function of wavelength. These features may be ordered or random as long as the features are sub-wavelength in scale.

Fused silica is commonly used as a substrate material that transmits in the near-infrared (NIR) region of the light spectrum. Additionally, various other materials have been used as substrate materials based on their ability to transmit energy in specific regions of the electromagnetic spectrum. A surface of each of these materials may be patterned to provide AR technology to the surface. However, fused silica and the other materials used in these approaches tend to be hydrophilic, which presents obstacles for use of the technologies in certain applications. Moreover, the application of nanostructures to a surface may increase the hydrophilicity of a material. Specifically, a nanopatterned surface of fused silica may be more hydrophilic when imprinted with nanostructures.

What is needed is a surface modification process for altering the surface of a highly transmissive, AR nanopatterned material to make them superhydrophobic, or to control their wetting properties such that they can also be made superhydrophilic. Such modification would broaden the scope of applications in which this technology can be used (e.g. windows, goggles, lenses, etc.).

SUMMARY OF THE INVENTION

The present disclosure relates to a method of forming a hydrophobic, anti-reflective material, which is transmissive in at least one wavelength in the ultraviolet to infrared range of the electromagnetic spectrum. The method includes steps providing a substrate having a transmissive wavelength in at least one wavelength in the ultraviolet to infrared range of the electromagnetic spectrum, the substrate comprising at least one surface including nanostructures of a size smaller than the at least one wavelength, functionalizing at least one surface to provide hydroxyl groups thereon, and contacting the at least one surface with a solution comprising a hydrophobic fluoropolymer for a sufficient time to apply at least a monolayer of a fluorine-containing material on the at least one surface.

In the foregoing methods, at least one hydrophobic fluoromonomer may comprise fluorine proximate to or at a first end and a hydroxyl-reactive group on the second end. The hydroxyl-reactive group is preferably trichlorosilane. The fluoromonomer is preferably selected from the group of perfluoroalkyl trichlorosilanes, such as 1H,1H,2H,2H-perfluorooctyl trichlorosilane and 1H,1H,2H,2H-perfluorodecyl trichlorosilane. Other fluorinated monomers, such as fluoroalkyl thiol, may also be used. In each of the foregoing embodiments, the contacting step may be carried out for a period of 10 seconds to 3 minutes with a solution of the fluoromonomer. In each of the foregoing embodiments, the functionalizing step may comprise plasma etching in an oxygen atmosphere. In each of the foregoing embodiments, the method may further comprise a step of curing at a temperature of at least 80° C. after the contacting step.

Also disclosed is a method of forming an anti-reflective, transmissive, superhydrophilic material. The method includes steps of providing a substrate, which is transmissive at at least one wavelength in the ultraviolet to infrared range of the electromagnetic spectrum. The substrate comprises at least one surface including nanostructures of a size smaller than the at least one wavelength of the substrate that provides less Fresnel reflection loss, and functionalizing at least one surface with hydroxyl groups thereon.

In each of the foregoing embodiments, the nanostructures may occur in a non-random pattern, a periodic pattern or in a random pattern. The nanostructures may have topological features selected from the group consisting of: jagged, pointed, cylindrical pillars, pointed cones, truncated cones, and a honeycomb pattern. The nanostructures are patterned into at least one surface of said substrate.

In each of the foregoing embodiments, the substrate may be formed from any material having the desired transmissive properties. The substrate may be selected from the group consisting of, fused silica, quartz-containing materials, germanium-containing materials, alumina-containing materials, sesquioxide based materials, yttrium aluminum garnet materials and other optical and non-optical glasses, crystals and ceramics. In each of the foregoing embodiments, the substrate may be transmissive at a range of wavelengths in the infrared range of the electromagnetic spectrum. Preferably, the substrate may be fused silica or germanium.

Additional details and advantages of the disclosure will be set forth in part in the description which follows, and/or may be learned by practice of the disclosure. The details and advantages of the disclosure may be realized and attained by means of the elements and combinations particularly pointed out in the appended claims. It is to be understood that both the foregoing general description and the following detailed description are exemplary and explanatory only and are not restrictive of the disclosure, as claimed.

BRIEF DESCRIPTION OF THE DRAWINGS

FIG. 1A is an edge-on scanning electron microscope (SEM) image of an embodiment showing nanostructures patterned (i) into a fused silica substrate (ii).

FIG. 1B is a SEM image of the structures of FIG. 1A taken top down.

FIG. 1C is a SEM image of the structures of FIG. 1A taken at a 30° angle.

FIG. 1D is an enlarged SEM image of the structures of FIG. 1C.

FIG. 2A shows photographic images of substrates made from germanium having various shapes of nanostructures patterned on a germanium substrate according to embodiments of the invention.

FIG. 2B is a top down SEM image of the embodiments of nanostructures patterned on a germanium substrate of FIG. 2A.

FIG. 2C is a SEM image of the structures of FIG. 2B taken at a 30° angle.

FIG. 5A is a representative image of a surface water contact angle on a fused silica substrate modified according to an embodiment of the present invention.

FIG. 5B is a picture of a fused silica substrate made according to an embodiment of the present invention.

FIG. 6 is a graph of % transmittance versus wavelength of various different fused silica substrates.

DETAILED DESCRIPTION

Figure 3:
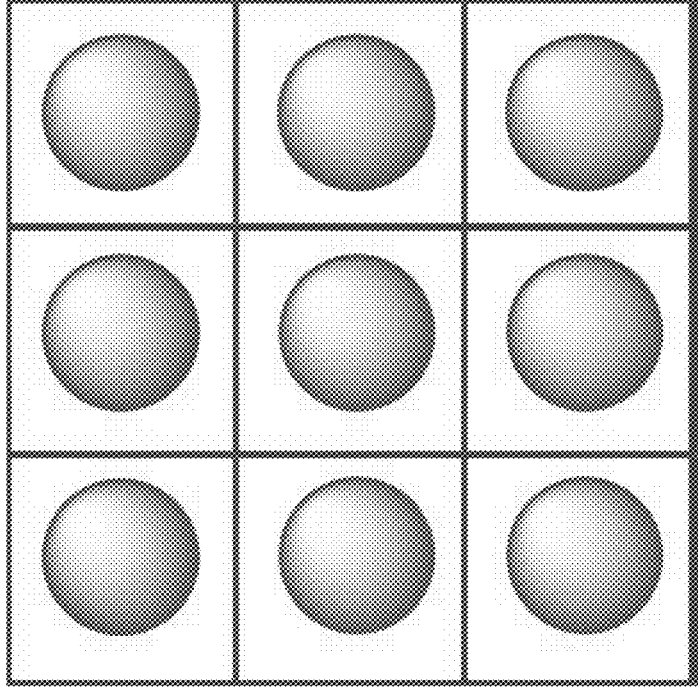
FIG. 3 is a drawing representing a testing pattern used to test the water contact angle of the invention.

Various embodiments of the disclosure provide a method for chemically modifying a light-transmissive, anti-reflective surface including nanostructures, such that the wetting properties of the surface can be altered as desired. Specifically, the surface may be made hydrophobic, superhydrophobic, or superhydrophilic, depending on the desired end use of the product.

The device created by the present method includes a substrate having at least one surface including a nanopatterned structure. Controlled nanopatterning of the substrate surface increases the transmission of the substrate by decreasing the surface reflectance, both of which are desirable qualities. The nanopatterned surface is then subjected to chemical modification to produce substrates that have beneficial surface wetting properties, desirable transmission in the ultraviolet, visible and infrared region of the optical spectrum, and advantageous light reflection properties.

The resulting chemically modified patterned surface may have decreased reflectance as compared with a non-chemically modified smooth surface of the same substrate. The resulting nanostructured surface after chemical modification may have increased transmission properties for certain target wavelengths, as compared with a non-chemically modified substrate material with the same nanostructured surface.

Wetting properties of a surface may be determined by observing the behavior of liquid droplets on the surface and measuring the contact angle formed at the location where the liquid-vapor interface contacts the solid-liquid interface. A hydrophilic material is a material having a contact angle for water on the surface of less than 90°. A superhydrophilic material is a material having a contact angle for water on the surface of less than 10°. A hydrophobic material has a water contact angle between 90° and 150°, and a superhydrophobic material has a water contact angle of 150° or greater.

Various different substrate materials are known to provide antireflective (AR) properties when they are modified to have nanostructures on at least one surface. Surface modification to provide nanostructures may be carried out by application of a coating to the surface, or by direct patterning of the surface of the substrate to include the nanostructure. Coatings have the potential drawback that delamination may occur. Therefore, directly patterning at least one surface of the substrate is preferable as it eliminates the possibility of coating delamination. Preferably, the nanostructures are patterned on one of the surfaces of the substrate, but the nanostructures may also be patterned on two, or more of the surfaces of a substrate material, if desired. The nanostructures are intentionally formed on at least one surface and they are not the same as surface scratches. Such unintentional surface scratches could reduce the transmission properties of a substrate material.

The substrate may be made of any material having transmissive properties for at least one wavelength of the electromagnetic spectrum. Fused silica is known to have good transmissive properties from the visible to near infrared (NIR, 1-2 μm) wavelengths. Optical materials having transmissive properties in other wavelength regions, such as the mid-wave infrared (MWIR, 2-5 μm) and long-wave infrared (LWIR, 8-14 μm), may be used as substrate materials. Additionally, optical materials having transmissive properties in the visible (400-1000 nm) and ultraviolet (UV, 10-400 nm) wavelength ranges may also be used as a substrate. Preferable materials for use as the substrate include, fused silica, quartz-containing materials, germanium-containing materials, alumina-containing materials, sesquioxide based materials, yttrium aluminum garnet materials, other optical and non-optical glasses, crystals, including, but not limited to diamonds, ceramics, as well as other transmissive materials. Preferably, the substrate is selected from fused silica and germanium, and even more preferably, the substrate is fused silica.

Each substrate material has transmissive properties within a known wavelength range, based on the inherent properties of the material. The nanostructures patterned onto the surface of the substrate may be formed in specific, sizes, shapes, and/or patterns, or may be randomized in order to provide the best transmissive and AR properties for each specific material. For example, FIGS. 1A and 1B show a randomized nanostructure patterned on the surface of a substrate made of fused silica. FIG. 1A is an edge-on scanning electron microscope (SEM) image showing the pattern and depth of the nanostructures on the underlying fused silica substrate. FIG. 1B shows a top down SEM image of the nanostructures on the fused silica substrate. FIGS. 1C and 1D are 30° tilted angle SEM images of the nanostructures on the fused silica substrate. The scale bars in FIG. 1A represents 1 μm and the scale bars in FIGS. 1B-1D represent 300 nm. As seen from the SEM images of FIGS. 1A-1D, the random nanostructures have jagged, pointed shapes with various, different dimensions. The random jagged structures are a preferred surface for use with fused silica for providing good transmission and AR properties.

The nanostructure shape and patterning need not be the same for every type of material that may be used as a substrate. FIG. 2A shows photographs of representative germanium substrates. FIGS. 2B and 2C show preferred nanostructure shapes and patterns for use on a surface of a substrate made from germanium. FIG. 2B are top-down SEM images of germanium substrate nanostructures. FIG. 2C are 30° tilted angle SEM images of the nanostructures preferred for use with germanium substrates. In FIGS. 2A-2C, Ge represents a non-nanostructured germanium surface. The scale bars in FIG. 2A represent 1 cm. The scale bars in FIG. 2B represent 10 μm, and the scale bars in FIG. 2C represent 1 μm.

The preferred nanostructures for use with germanium substrates have periodic patterns of pillar-like shapes (shown as $Ge_P$ in FIGS. 2A-2C), truncated cone shapes (shown as $Ge_C$ in FIGS. 2A-2C), or honeycomb shape (shown as $Ge_{HC}$ in FIGS. 2A-2C). In the pillar and truncated cone embodiments, each of the pillars or cones is similar in size and shape to the other pillars, or cones forming a substantially uniform pattern of nanostructures. Likewise, the honeycomb-shaped structure is also a uniform pattern of recessed spaces. Such patterned, uniform nanostructures provide good transmission and AR properties using a germanium substrate.

Preferable shapes for each of the various materials are known and any shape or combination of shapes of nanostructures that provide beneficial transmission and AR properties to the material may be used in the present method. Such nanostructure shapes may include cylindrical pillars, pointed cones, truncated cones, honeycomb patterns, as well as various combinations of one or more of these and other structural shapes. Depth, width, angle, periodicity, degree of taper, and the geometry of the nanostructure is carefully designed and applied to the substrate to provide the desired performance of the device. The substrate material and the nanostructure pattern used on at least one surface of the material may be selected based on the desired wavelength to be transmitted through the substrate.

Many materials with transmissive properties that are suitable for nanostructure patterning to provide materials with good transmissive and AR properties tend to be hydrophilic. Moreover, the patterning of the nanostructures onto the surface of these materials may result in the substrate becoming even more hydrophilic, as in the case of fused silica. The hydrophilic nature of these substrates may present obstacles for their use in certain applications. Depending on the material used for the substrate and the desired end use, the following process may be used to make the substrate hydrophobic, superhydrophobic, or superhydrophilic.

After obtaining a substrate having at least one surface including nanostructures, the substrate surface including the nanostructures thereon is cleaned. The cleaning process utilized for this purpose should not damage the nanoscale features of the substrate surface. This cleaning may be carried out by using a process that forms hydroxyl moieties on the surface. Such processes include plasma etching under an $O_{2(g)}$ atmosphere, piranha etching, and other known processes such as treatment with KOH/Alcohol solutions. Preferably, the surface of the substrate is cleaned using a plasma etching device under an $O_{2(g)}$ atmosphere. The plasma etching process may be carried out at any time, temperature and pressure that is commonly known in the art. Preferably, the plasma etching process under $O_{2(g)}$ atmosphere is conducted for a time of up to 10 minutes under pressure (e.g. 320 mTorr) and high power (e.g. 200 W).

As a result of the cleaning step, hydroxyl groups are formed on the surface of the substrate that includes the nanostructures. If not further modified, these hydroxyl groups may interact with water to attract the water to the surface. Thus, a surface that includes the nanostructures and is functionalized with hydroxyl groups tends to be superhydrophilic. In some cases, a superhydrophilic surface may be desired. In such cases, the process may be terminated at this point to obtain a material that is anti-reflective, light transmissive and superhydrophilic.

If a hydrophobic or superhydrophobic material is desired, the process may be continued with a step of chemically modifying the surface with the hydroxyl groups to create a coating on the surface. The reactive hydroxyl groups that result from the cleaning step are used in the coating step to form a material having a surface with the desired level of hydrophobicity.

The chemical treatment may be accomplished by applying a self-assembled monolayer of a hydrophobic material on the surface of the substrate. The chemical treatment may use any monomer that is capable of binding with hydroxyl groups located on the surface of the substrate on a first end, and contains a hydrophobic element on a second end. The hydrophobic element is preferably fluorine, and the hydrophobic material may be a hydrophobic fluoromonomer. More preferably, the hydrophobic fluoromonomer contains a trichlorosilane group as the hydroxyl-reactive group, and the hydrophobic fluoromonomer is preferably 1H, 1H,2H,2H-perfluorooctyl trichlorosilane (PFOTS), or 1H, 1H,2H,2H-perfluorodecyl trichlorosilane. Most preferably, the hydrophobic fluoromonomer is 1H,1H,2H,2H-perfluorooctyl trichlorosilane. Other hydrophobic coatings may also be applied to the surface of the substrate, including, 1H,1H, 2H,2H-perfluorodecyl acrylate, an amorphous polytetrafluoroethylene resin, and a fluoroalkyl thiol.

Trichlorosilanes are preferred because they readily form self-assembled monolayers (SAMs) on hydroxyl-functionalized surfaces. As a consequence, when molecules having a trichlorosilane group are introduced to the surface, the molecules self-align forming a surface with the trichlorosilane facing the substrate and the opposite end of the molecule facing away from the substrate. In the case of PFOTS, the fluorine-containing moieties are located at the air interface. The fluorine moieties individually occupy a large spatial area, and their collective SAM alignment above the substrate surface makes the surface hydrophobic or superhydrophobic.

Once the coating is formed, the chemically modified substrate may be cured, e.g. by thermal curing, to solidify the bonding between the substrate and the coating. The chemical modification typically forms a monolayer of the hydrophobic material on the surface. A monolayer of the described materials does not cause a significant change in the optical properties of the substrate material.

A particular method for coating the surface of a fused silica substrate is described in more detail below. A fused silica substrate having random, rugged, pointed nanostructures extending approximately 800 nm into the surface of the substrate on at least one surface is obtained by any suitable method. The size of the nanostructures may be in any range such that the structures are smaller than the wavelength of the electromagnetic energy that is transmitted by the substrate. Optionally, two or more surfaces of the substrate may also be patterned.

The fused silica substrate having the nanostructured surface may be cleaned using a plasma etching device under an $O_{2(g)}$ atmosphere. After cleaning, the substrate is passed through a solution of hexanes containing 0.5% PFOTS in a swirling fashion for a short period of time to contact the nanostructured surface with the PFOTS. The short swirling or contacting period prevents the buildup of non-specifically bound PFOTS on the surface of the substrate, which could potentially cloud the surface, causing a decrease in the substrate's transmissive properties. Preferably, the short swirling or contacting period ranges from 10 seconds to 3 minutes, more preferably, the short swirling or contacting period is from 10 second to 1 minute, and most preferably, the swirling or contacting period is up to 30 seconds.

The substrate is then thermally cured at 120° C. to solidify bonding between the fused silica and the PFOTS molecules. The temperature for thermal curing is selected based on the materials used as the substrate and as the coating and is typically at least 80° C. The 120° C. is preferable for use with fused silica and PFOTS. The range of about 105° C. to about 120° C. is acceptable for use with these particular materials. Any suitable curing temperature for curing the particular materials used for the substrate and coating may be employed.

Amounts, times, temperatures and other variables in the process can be altered depending on the specific substrate and other materials being used. Overall, the disclosed process is straightforward, scalable, and applicable in numerous markets such as, but not limited to, the self-cleaning materials market (i.e. materials with high contact angle, superhydrophobic surfaces that cause the beading and rolling off of water droplets at shallow slide angles) and the high transmission optical coatings market.

The following examples are illustrative, but not limiting, of the methods and compositions of the present disclosure. Other suitable modifications and adaptations of the variety of conditions and parameters normally encountered in the field, and which are obvious to those skilled in the art, are within the spirit and scope of the disclosure. All patents and publications cited herein are fully incorporated by reference herein in their entirety.

EXAMPLES

Water contact angle measurements were taken using a Ramé-Hart instrument, model #590-F4. 10 μL droplets of room temperature, deionized water were placed on the surface of the patterned substrates. Measurements were taken in a three by three grid fashion, with nine contact angle values recorded for each substrate, as illustrated in FIG. 3, which shows the spheres of 10 μL water droplets depicted on a substrate divided into a three by three grid. The best value and an average of all nine values were determined for each substrate. The area of each of the 10 μL droplets of water that was in contact with the nanostructured surfaces was determined by the Cassie-Baxter equation:

$$\text{Cos } CA_{avg} = \varphi_s(\cos \theta_s + 1) - 1$$

Where $CA_{avg}$ is the average water contact angle, $\theta_s$ is the intrinsic water contact angle for unmodified, flat fused silica, and cps is the area of the substrate surface in contact with the water.

Advancing ($CA_{Adv}$) and receding water contact angles ($CA_{Rec}$) were determined using the "sessile drop" method, as described by J. T. Korhonen, T. Huhtamaki, O. Ikkala, R. H. Ras, *Langmuir: ACS J. Surf. Colloids* 29 (2013) 3858-3863.

Spectroscopic data was collected for each of the samples. UV-visible-NIR data were obtained both before and after surface modification using an Agilent Technologies Cary 7000 Universal Measurement Spectrophotometer in the wavelength range of 250-2300 nm. Specifically, percent transmission and percent reflectance data were obtained.

Scanning electron micrograph images were taken using a Carl Zeiss LEO Supra 55 scanning electron microscope. Images were taken at 0°, 10°, 20°, and 30° to visualize surface topography.

Comparative Example 1

The device of Comparative Example 1 was created using a flat UV grade fused silica substrate. The flat silica substrate was plasma cleaned by subjecting it to an $O_{2(g)}$ atmosphere for 10 minutes in a March Plasma Reactive Ion Etcher under a pressure of 320 mTorr, and at a power of 200 W. The flat fused silica substrate was tested using the testing procedures described above.

Comparative Example 2

The device of Comparative Example 2 was created using a flat UV grade fused silica substrate. The flat silica substrate was plasma cleaned by subjecting it to an $O_{2(g)}$ atmosphere for 10 minutes in a March Plasma Reactive Ion Etcher under a pressure of 320 mTorr, and at a power of 200 W. Following the plasma clean, the flat substrate was immersed and gently agitated in a solution of hexanes that contained 0.5 vol % PFOTS for less than a minute.

Figures 4A, 4B:
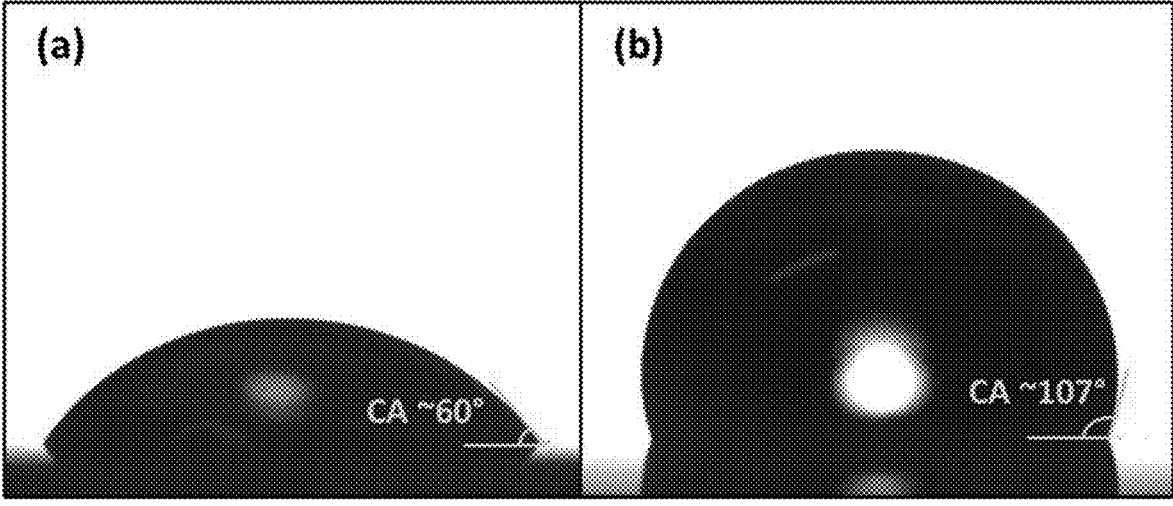
FIG. 4A is a representative image of a surface water contact angle on a flat silica substrate.
FIG. 4B is a representative image of a surface water contact angle on a flat silica substrate with chemical modification.

Although the application of PFOTS onto the flat fused silica surface did not result in a superhydrophobic surface, the chemical modification that resulted was effective to improve the hydrophobicity of the non-nanostructured fused silica. More specifically, the contact angle was increased from 60.9°±5.3° to 107.5°±3.2°, as shown in FIG. 4 and included in Table 1 below.

Comparative Example 3

The device of Comparative Example 3 employed a UV grade fused-silica substrate, which was randomly pre-patterned on one side with a nanostructure extending approximately 800 nm into the surface of the substrate. The substrate was subjected to an $O_{2(g)}$ atmosphere for 10 minutes in a March Plasma Reactive Ion Etcher under a pressure of 320 mTorr, and at a power of 200 W.

Example 1

UV grade fused-silica substrates, which were randomly pre-patterned on one side with nanostructures extending approximately 800 nm into the surface of the substrate, were subjected to an $O_{2(g)}$ atmosphere for 10 minutes in a March Plasma Reactive Ion Etcher under a pressure of 320 mTorr, and at a power of 200 W. The substrates were then removed, immersed and swirled for 30 seconds in hexanes that contained 0.5% 1H,1H,2H,2H-perfluorooctyl trichlorosilane (PFOTS). The substrates were immediately rinsed with hexanes, blown dry with $N_{2(g)}$ and placed in an oven to bake for 15 minutes at 120° C. The substrates were removed from the oven and allowed to cool.

Water Contact Angle Analysis

Water contact angle measurements were taken using the devices of Comparative Examples 1-3 and Example 1. The device of Comparative Example 1 had a contact angle indicative of a hydrophilic substance. The contact angle of the device of Comparative Example 3 was found to be nearly 0° (i.e. superhydrophilic) because the fluid readily spread out along the substrate surface upon contact, rendering both the slide angle (SA) and contact angle immeasurable.

For the substrate of Example 1, the surface exhibited superhydrophobicity, with the greatest contact angle being 176°. The average contact angle was 172.8°±4.5°. An example contact angle for a water droplet on the surface of Example 1 is shown in FIG. 5A. To determine the amount of water in contact with the surface, the Cassie-Baxter equation was employed. Using this equation, it was determined that the fraction of the water droplets in contact with the nanostructured surface was 0.01. By comparison, the Cassie-Baxter value for flat fused silica was determined to be 0.47, indicating that much more of a single 10 µL droplet of water was in contact with the non-nanostructured fused silica surface of the device of Comparative Example 3 than the chemically modified surface of the device of Example 1. The results of the water contact analysis for the four analyzed samples are included in Table 1.

Example 1 behaves as an almost ideal surface. The hysteresis value of an ideal surface would be 0°.

Chemically modifying the fused silica patterned structure with PFOTS (Ex. 1) resulted in a hydrophobicity greater than that of either the PFOTS on a flat fused silica substrate (Comp. Ex. 2), or the fused silica having nanostructures that were not chemically modified with PFOTS (Comp. Ex. 3). The hydrophobicity was increased by a much larger amount than would have been predicted. Increases in water contact angle of greater than 60% were consistently measured.

Transmittance and Reflectance Properties

Transmittance and reflectance properties were measured as discussed above. With a transmittance of approximately 92% from the UV through the NIR spectra (with the exception of the —OH overtone peaks seen at 1390 nm and 2200 nm), uncoated UV grade fused silica is a common standard for visible and infrared transmission quality. When fused silica is nanopatterned on one side, its transmittance can be improved by almost 4% for most of this range, as seen in FIG. 6, wherein the dashed line represents the unmodified flat fused silica of Comparative Example 1 and the other two lines represent the non-chemically modified (Comparative Example 3) and chemically modified (Example 1) fused silica with nanopatterning. In FIG. 6, the red line represents Comparative Example 3 and the blue line represents Example 1. As is typical for this type of AR structure, transmittance decreases in the UV wavelength range as a result of scattering due to the nanostructures. Following the processing of the substrate, there was less than a 1% decrease in transmittance for the majority of the region interrogated. This demonstrates that the fused silica substrates having nanostructures on at least one surface can undergo chemical modification while retaining the desirable high transmittance properties in the visible-NIR region of the spectrum.

The transparency of the substrate of Example 1 is also shown in FIG. 5B, which shows four colored water drops on the substrate. The image behind the substrate can be clearly seen which demonstrates the transparency of the substrate.

Figure 7:
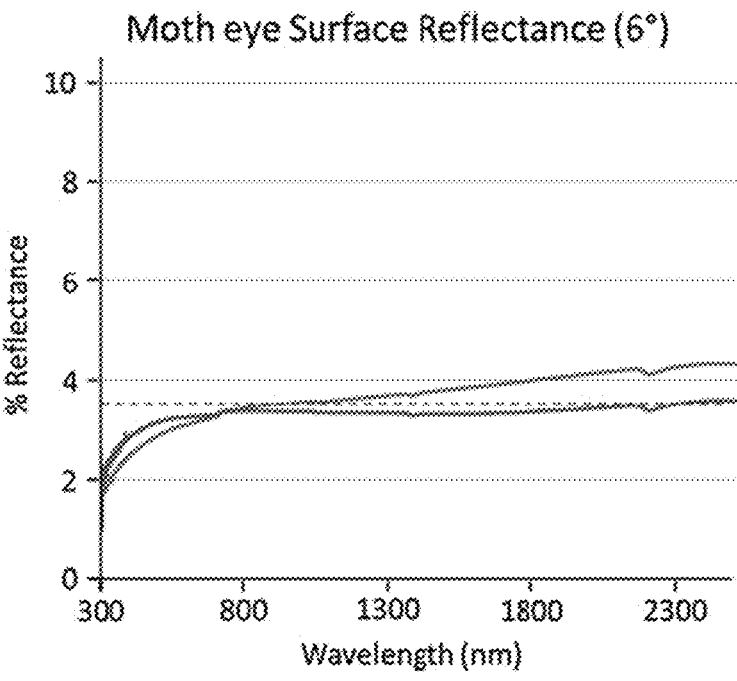
FIG. 7 is a graph of % reflectance versus wavelength of various different nanostructured fused silica substrates.

Maintaining the reflectance properties of the material is also desirable. Data were taken using the devices of Comparative Example 2 and Example 1. As with the transmission properties, there was only a slight change in the reflectance properties after chemical modification of the nanostructure fused silica substrate, as seen in FIG. 7. The reflectance values were comparable to the theoretical value of 3.5% for an ideal one-sided, UV grade, and AR modified fused silica substrate, which is shown as the dashed line in FIG. 7. The

TABLE 1

| Example | Slide Angle | Contact Angle (CA) | $CA_{Adv}$ | $CA_{Rec}$ | Hysteresis Value | Cassie-Baxter Value |
|---|---|---|---|---|---|---|
| Comparative 1 | >10° | 60.9° ± 5.3° | 54.4° | 52.4° | 2° | N/A |
| Comparative 2 | >10° | 107.5° ± 3.2° | 105.3° | 85.4° | 19.9° | 0.47 |
| Comparative 3 | N/A | N/A | N/A | N/A | N/A | N/A |
| Example 1 | <1° | 172.8° ± 4.5° | 164.4° | 160.9° | 3.5° | 0.01 |

The hysteresis value (H) was determined using the equation:

$$H=CA_{Adv}-CA_{Rec}$$

For the device of Example 1, the hysteresis value was determined to be 3.5°. This small hysteresis value suggests that the nanostructured and chemically treated substrate of chemically modified substrate of Example 1 had a slightly higher reflectance than the non-chemically modified nanostructured surface. In FIG. 7, the red line represents the % reflectance of Comparative Example 2 and the blue line represents the % reflectance of Example 1. Ultimately, these data confirm that the nanopatterned surface topology improved the reflectance characteristics of the fused silica material, and that this reflectance character is essentially maintained after chemical modification.

In addition to exhibiting superhydrophobicity following surface modification, the chemically modified, nanostructured, fused silica substrate of Example 1 also maintained its transparency and anti-reflectance character.

Seawater Incubation Tests

To evaluate the efficacy of the chemical modification in harsher conditions, the devices were incubated in seawater. Clean fused silica substrates prepared according to Comparative Examples 1-3 above were immersed in artificial seawater (meeting ASTM standard D1151-98) that was purchased from Lake Products Company, LLC, and used as received. The surface modified fused silica nanostructured substrate, prepared according to Example 1 above was also tested under the same conditions. Each of the substrates was subjected to a 20 hour incubation period in the artificial seawater. Following incubation, water contact angle measurements were obtained using the same test discussed above. Deionized water was used for the contact angle measurements.

Incubating the non-nanostructured fused silica without chemical modification in seawater yielded a surface having water contact angles of approximately 45°, which is significantly less than the contact angle of approximately 60° determined for the clean sample. However, upon sonication in deionized water for 5 minutes the contact angle could be restored to approximately 60°.

Incubating the nanostructured fused silica in seawater yielded an extremely hydrophilic surface. The water contact angle was less than 1° and was essentially immeasurable.

The chemically modified non-nanostructured fused silica substrate produced contact angles that were within the margin of error of each other both before and after seawater incubation. This was likely due to the fact that there were no nanoscale features on the surface to alter the surface response to the chemical modification.

Figures 8A, 8B:
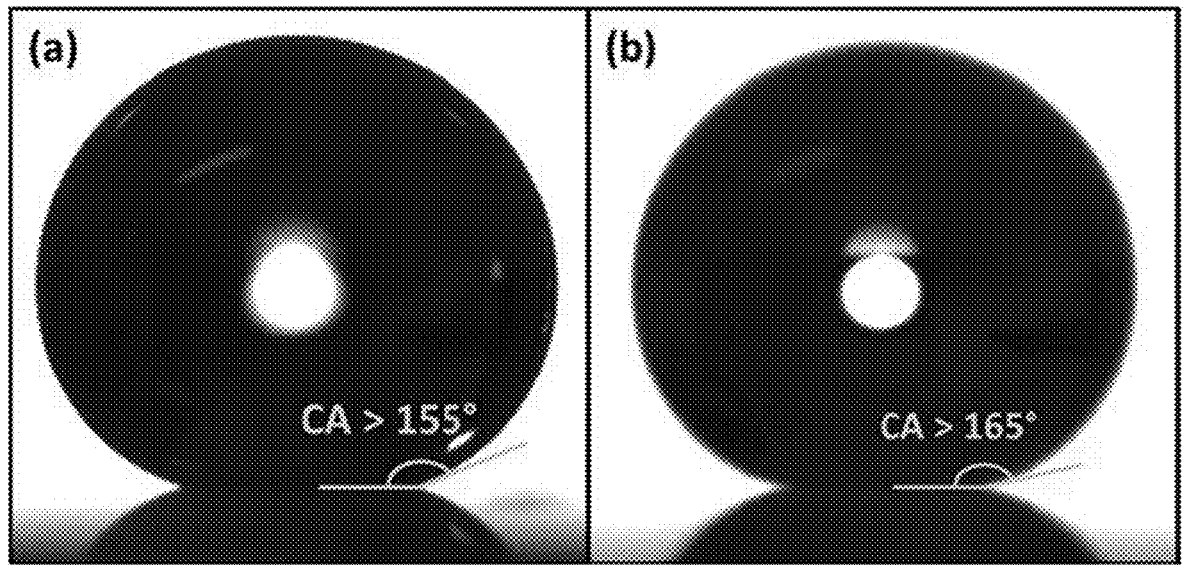
FIGS. 8A and 8B are representative images of a surface water contact angle on a fused silica substrate modified according to an embodiment of the present invention related to submersion and incubation in seawater.

There was a noticeable effect of seawater incubation on the chemically modified, nanostructured fused silica substrate. However, the surface remained superhydrophobic with an average water contact angle of 157.1°±9.4°. The water contact angle increased after sonication in deionized water for 5 minutes. The average contact angle after sonication was 166.5°±5.7°. These results are shown in FIG. 8 and indicate that the chemical modification of the nanostructured fused silica substrate was stable when exposed to seawater.

Example 2

PFOTS (or similar functioning species) can be applied to other optical materials with surface anti-reflective structures to enable superhydrophobicity in other wavelength regions, such as the mid-wave infrared (MWIR) and long-wave infrared (LWIR). The application to substrate materials other than fused silica was demonstrated in Example 2 using germanium substrates. Each device using a germanium substrate had a differently shaped periodic, nanoscale surface pattern as shown in FIGS. 2A-2C. These non-random patterns include nano-pillars (shown as $Ge_P$), truncated nano-cones (shown as $Ge_C$), and/or honeycomb patterns (shown as $Ge_{HC}$). The substrates were chemically treated using the same process as described in Example 1.

Water Contact Angle Analysis

Figures 10A, 10B, 10C, 10D:
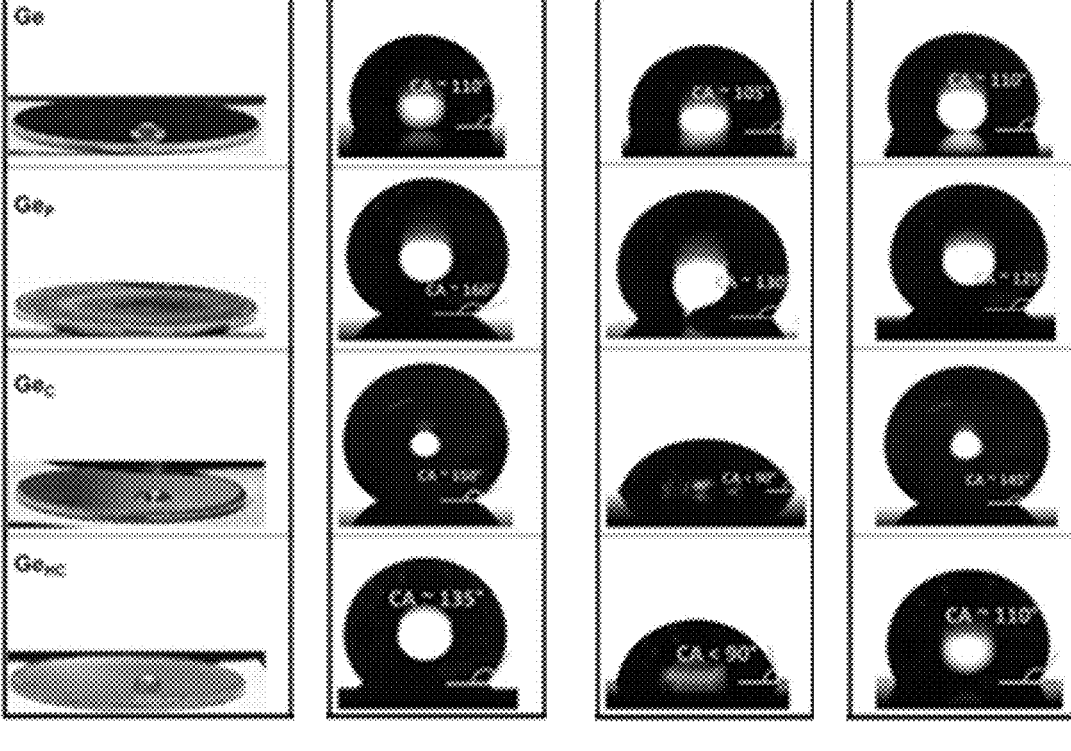
FIG. 10A shows photographic images of a drop of water on unmodified germanium surfaces containing the nanostructures of FIG. 2A.
FIG. 10B shows representative images of a surface water contact angles on the germanium substrates of FIG. 10A modified according to an embodiment of the present invention.
FIG. 10C shows representative images of a surface water contact angles on germanium substrates of FIG. 10B related to submersion and incubation in seawater.
FIG. 10D shows representative images of a surface water contact angles on germanium substrates of FIG. 10B related to sonication in deionized water after submersion and incubation in seawater.

Following chemical modification of the germanium substrates, the contact angle for water was measured following the procedure included above. After chemical modification with PFTOS, each of the germanium substrate surfaces exhibited water contact angles that had greater hydrophobicity than its corresponding non-treated surface. FIG. 10A are pictures of a water drop on the different germanium surfaces having differently shaped nanostructures prior to chemical modification. FIG. 10B shows a representative contact angle of a water drop with each of the germanium surfaces having differently shaped nanostructures after the substrates were chemically modified. The contact angle for the PFOTS treated surface without nanostructures was approximately 110°, the PFOTS treated surface with pillar-shaped nanostructures was approximately 160°, the PFOTS treated surface with truncated-cone-shaped structures was approximately 150°, and the PFOTS treated surface having honeycomb shaped nanostructures was approximately 135°. A comparison of FIG. 10A with FIG. 10B shows that the chemical modification of the germanium substrates greatly increased their hydrophobicity.

Transmittance Properties

Figure 11:
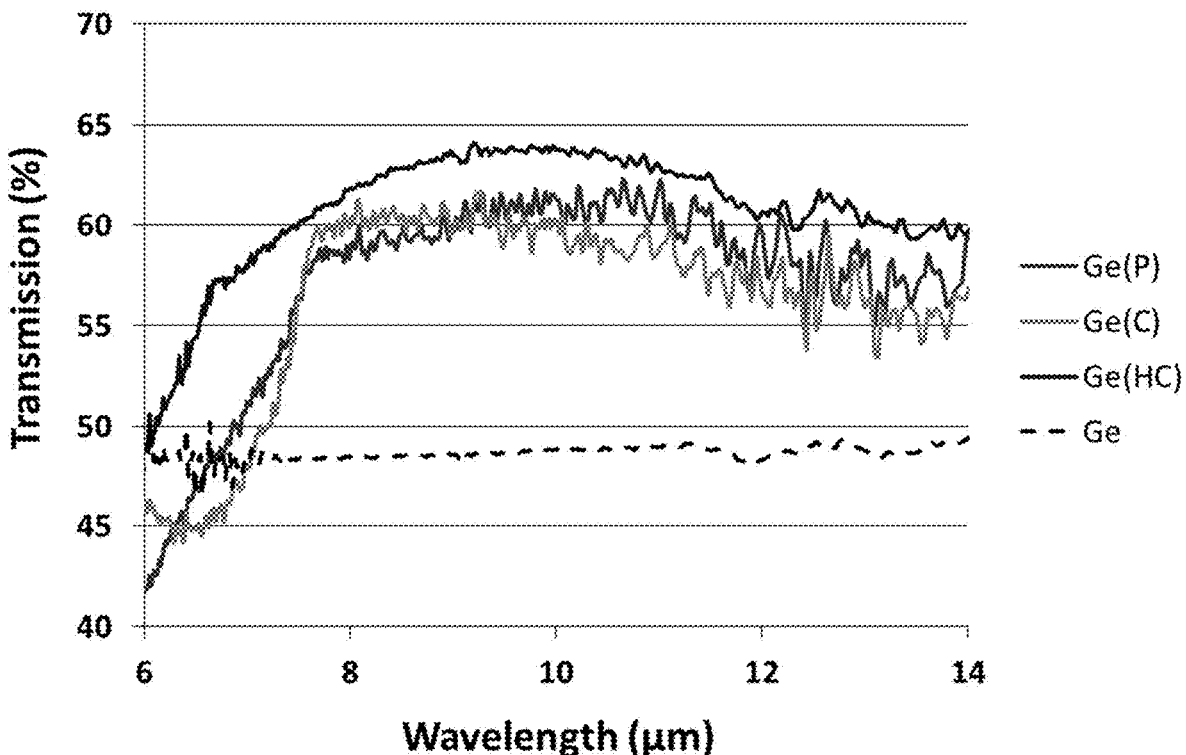
FIG. 11 is a graph of % transmission versus wavelength of germanium substrates having nanostructures of various different shapes.

The transmittance of substrates having nanostructures thereon in the MWIR and LWIR wavelengths was determined as included above, and is shown in FIG. 11. FIG. 11 shows a comparison of the % transmittance of non-chemically modified germanium substrates having different shapes of nanostructures on one surface. The different shapes are shown in FIGS. 2A-2C and include pillars, truncated cones, and a honeycomb shape. The transmittance of the baseline flat non-chemically modified germanium substrate is shown in FIG. 11 as the dashed line. In FIG. 11, the transmittance of the substrates with the pillar-shaped nanostructures, the truncated cone-shaped nanostructures, and the honeycomb-shaped nanostructures are shows as red, green, and blue, lines, respectively. FIG. 11 shows that the transmittance of the substrates including nanostructures of any of the tested shapes was higher than the flat germanium surface at almost all wavelengths tested.

Figure 9:
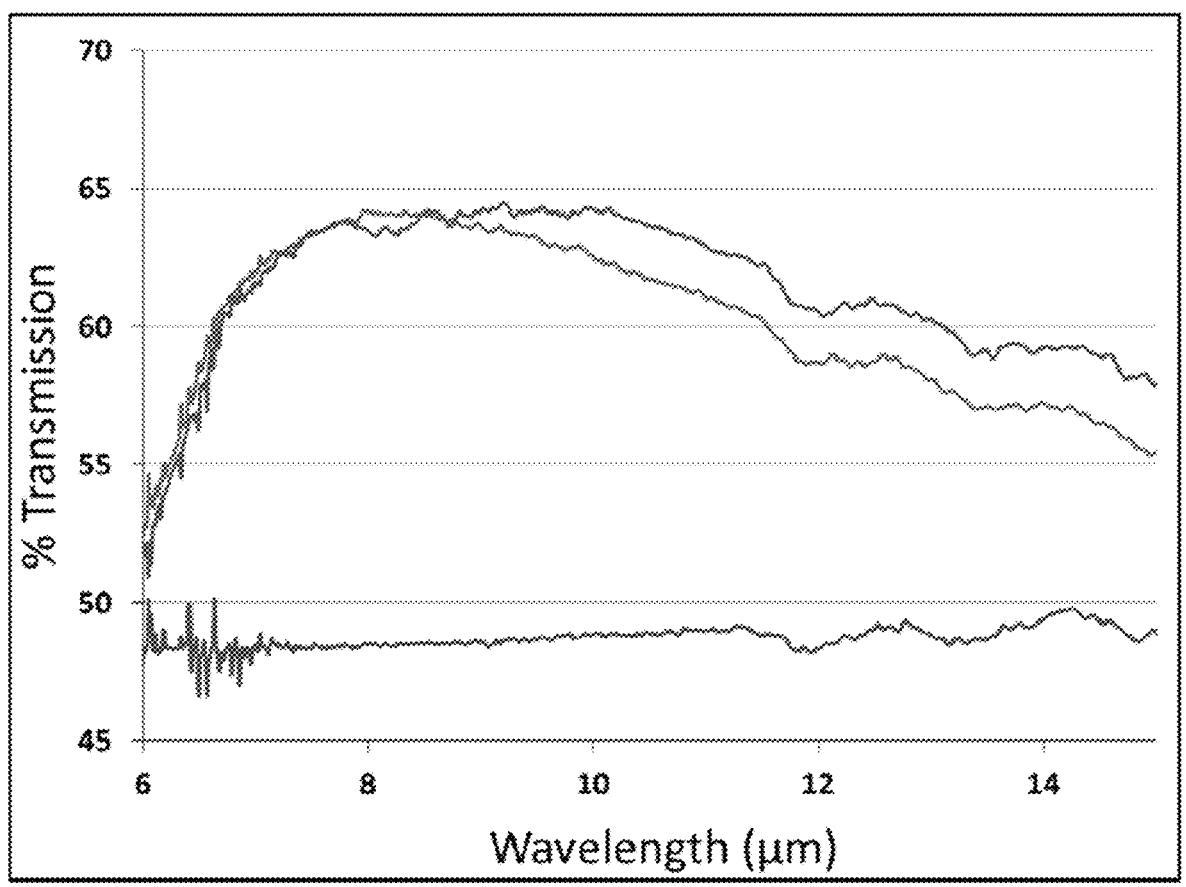
FIG. 9 is a graph of % transmission versus wavelength of various different germanium substrates.

The transmittance of a chemically modified substrate having nanostructures thereon in the MWIR and LWIR wavelengths was determined and is shown in FIG. 9. FIG. 9 shows a comparison of the chemically modified and non-chemically modified germanium substrates having nanopatterns on one surface as the two curves that are similarly shaped and are generally in the 55-65% transmittance range. The % transmittance of the non-chemically modified and chemically modified germanium substrates are shown in FIG. 9 as the blue line and the red line, respectively. The transmittance of the baseline flat non-chemically modified germanium substrate is also shown in FIG. 9 as the gray dashed line, which is the lowest line and is located below the 50% transmittance level for the entire tested spectrum. Following chemical modification, the germanium substrate surfaces produced water contact angles that were hydrophobic, and the transmittance of the material was essentially unchanged.

Figure 12:
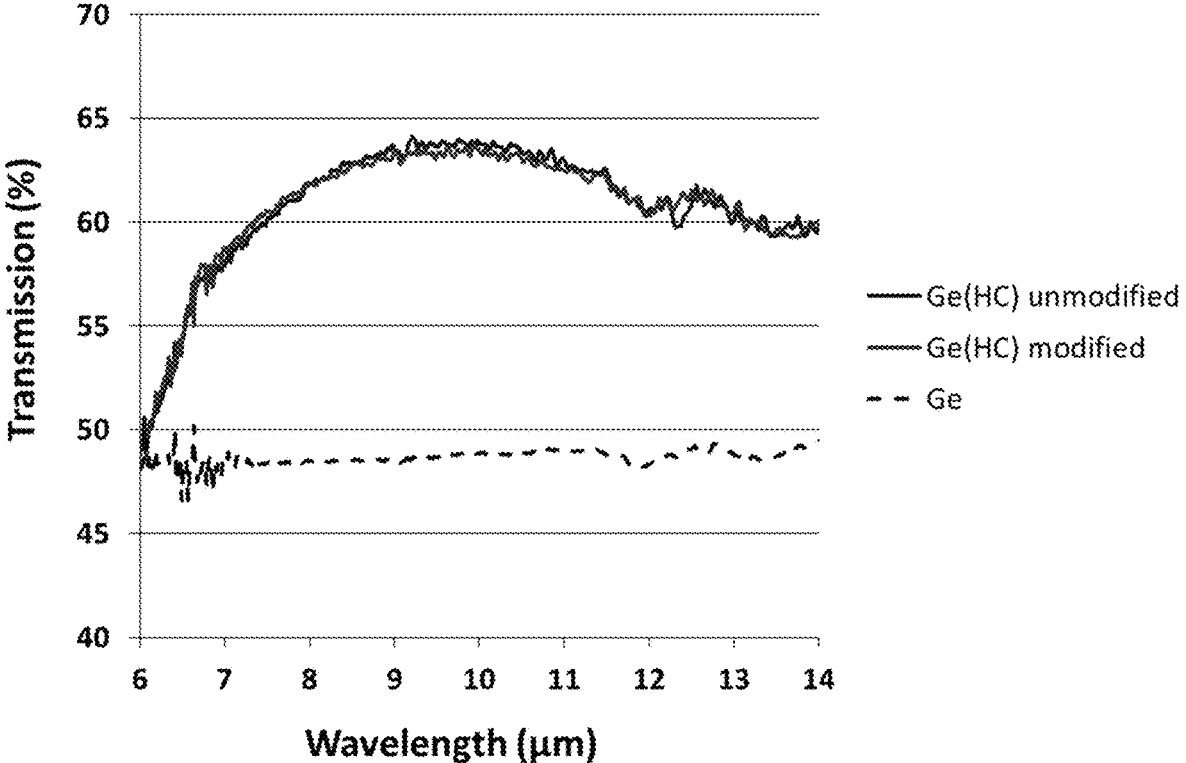
FIG. 12 is a graph of % transmission versus wavelength of various different germanium substrates having honeycomb-shaped nanostructures.

The % transmittance of the chemically modified substrates having nanostructures with a honeycomb shape, shown as $Ge_{HC}$ in FIGS. 2A-2C, were determined and are shown in FIG. 12. FIG. 12 shows a comparison of the chemically modified and non-chemically modified germanium substrates having the honeycomb shaped nanostructures on one surface. The grey dashed line is the baseline flat, non-chemically modified germanium substrate. The blue line is the non-chemically modified honeycomb nanostructured substrate and the red line is the chemically modified honeycomb nanostructured substrate. The transmittance of the chemically modified germanium substrate having honeycomb shaped nanostructures on one surface was essentially unchanged from the transmittance of the non-chemically modified germanium substrate having honeycomb shaped nanostructures on one surface.

Seawater Incubation Tests

To evaluate the efficacy of the chemical modification to the germanium substrates in harsher conditions, the devices formed from germanium substrates were also incubated in seawater. Chemically modified flat germanium substrate (shown as Ge in FIGS. 2A-2C and 10A-10D), and chemically modified germanium substrates having one surface with nanostructures patterned thereon were tested. Each of the different nanostructure shapes and patterns shown in FIGS. 2A-2C were tested with the seawater incubation method. Specifically, substrates having pillar-shaped (shown as $Ge_P$ in FIGS. 2A-2C and 10A-10D), truncated cone-shaped (shown as $Ge_C$ in FIGS. 2A-2C and 10A-10D), and honeycomb-shaped (shown as $Ge_{HC}$ in FIGS. 2A-2C and 10A-10D) nanostructures were tested.

Clean germanium substrates prepared according to the method used for the fused silica samples above were immersed in artificial seawater and tested according to the same procedure as used for the fused silica devices discussed above. Deionized water was used for the contact angle measurements.

FIG. 10C shows representative water contact angles for the substrates after seawater incubation. Incubating the chemically modified non-nanostructured germanium in seawater yielded a surface having water contact angles of approximately 105°, which is close to the 110° for the contact angle prior to seawater incubation. As with the fused silica samples, the small change was likely due to the fact that there were no nanoscale features on the surface to alter the surface response to the chemical modification There was a noticeable decrease in the contact angle of all of the chemically modified, nanostructured germanium substrates after incubation in seawater. However, the surface of each of the substrates remained hydrophobic.

After the seawater incubation, each of the samples were sonicated in deionized water for 5 minutes. Representative contact angle measurements for each of the germanium samples after sonication is shown in FIG. 10D. For almost all of the samples the average contact angle after sonication increased compared to the samples that were incubated in seawater. These results indicate that the much of the hydrophobicity from the chemical modification of the nanostructured fused silica substrate was recoverable after seawater incubation.

The data generated and shown in FIGS. 9, 10 and 12, indicate that the process for providing a superhydrophobic, anti-reflective optical material may be used on materials other than fused silica that are known to have acceptable transmissive properties in the desired wavelength range. The similar results between substrates of fused silica and substrates of germanium show that the process is effective on different substrates, and is applicable to other substrates, which have difference transmittance properties. Additionally, the data from the Examples shows that the method is applicable to substrates having different shapes, patterns, or randomized nanostructures on at least one surface.

At numerous places throughout this specification, reference has been made to a number of U.S. patents and other documents. All such cited documents are expressly incorporated in full into this disclosure as if fully set forth herein.

Other embodiments of the present disclosure will be apparent to those skilled in the art from consideration of the specification and practice of the embodiments disclosed herein. As used throughout the specification and claims, "a"

and/or "an" may refer to one or more than one. Unless otherwise indicated, all numbers expressing quantities of ingredients, properties such as molecular weight, percent, ratio, reaction conditions, and so forth used in the specification and claims are to be understood as being modified in all instances by the term "about," whether or not the term "about" is present. Accordingly, unless indicated to the contrary, the numerical parameters set forth in the specification and claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. It is intended that the specification and examples be considered as exemplary only, with a true scope and spirit of the disclosure being indicated by the following claims.

The foregoing embodiments are susceptible to considerable variation in practice. Accordingly, the embodiments are not intended to be limited to the specific exemplifications set forth herein above. Rather, the foregoing embodiments are within the spirit and scope of the appended claims, including the equivalents thereof available as a matter of law.

The patentees do not intend to dedicate any disclosed embodiments to the public, and to the extent any disclosed modifications or alterations may not literally fall within the scope of the claims, they are considered to be part hereof under the doctrine of equivalents.

It is to be understood that each amount/value or range of amounts/values for each component, compound, substituent or parameter disclosed herein is to be interpreted as also being disclosed in combination with each amount/value or range of amounts/values disclosed for any other component(s), compounds(s), substituent(s) or parameter(s) disclosed herein and that any combination of amounts/values or ranges of amounts/values for two or more component(s), compounds(s), substituent(s) or parameters disclosed herein are thus also disclosed in combination with each other for the purposes of this description. It is further understood that each range disclosed herein is to be interpreted as a disclosure of each specific value within the disclosed range that has the same number of significant digits. Thus, a range of from 1-4 is to be interpreted as an express disclosure of the values 1, 2, 3 and 4.

It is further understood that each lower limit of each range disclosed herein is to be interpreted as disclosed in combination with each upper limit of each range and each specific value within each range disclosed herein for the same component, compounds, substituent or parameter. Thus, this disclosure to be interpreted as a disclosure of all ranges derived by combining each lower limit of each range with each upper limit of each range or with each specific value within each range, or by combining each upper limit of each range with each specific value within each range.

Furthermore, specific amounts/values of a component, compound, substituent or parameter disclosed in the description or an example is to be interpreted as a disclosure of either a lower or an upper limit of a range and thus can be combined with any other lower or upper limit of a range or specific amount/value for the same component, compound, substituent or parameter disclosed elsewhere in the application to form a range for that component, compound, substituent or parameter.

What is claimed is:

1. A method of forming an anti-reflective, transmissive, superhydrophilic material, comprising:

providing a substrate that is transmissive in at least one wavelength in the infrared to ultraviolet range of the electromagnetic spectrum and comprising at least one surface having nanostructures of a size smaller than the at least one wavelength patterned directly into the at least one surface without a separate coating that can delaminate; and functionalizing the at least one surface with hydroxyl groups thereon to form an anti-reflective, transmissive, superhydrophilic material, wherein the functionalizing step comprises plasma etching in an oxygen atmosphere.

2. The method of claim 1, wherein the substrate is selected from the group consisting of, fused silica, quartz-containing materials, germanium-containing materials, alumina-containing materials, and other optical and non-optical glasses, crystals and ceramics.

3. The method of claim 1, wherein the at least one wavelength comprises a range of wavelengths in the infrared range of the electromagnetic spectrum.

4. The method of claim 1, wherein the nanostructures have topological features selected from the group consisting of: jagged, pointed, cylindrical pillars, pointed cones, truncated cones, and a honeycomb pattern.

5. The method of claim 1, wherein the substrate is fused silica.

*     *     *     *     *